J. FARRELL.
NUT LOCK.
APPLICATION FILED AUG. 13, 1913.
1,098,790.
Patented June 2, 1914.
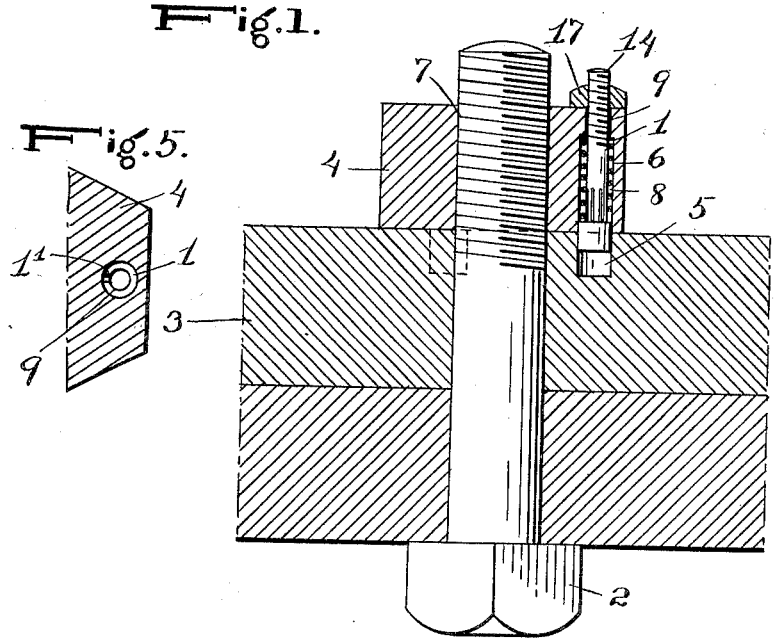
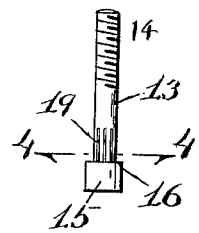
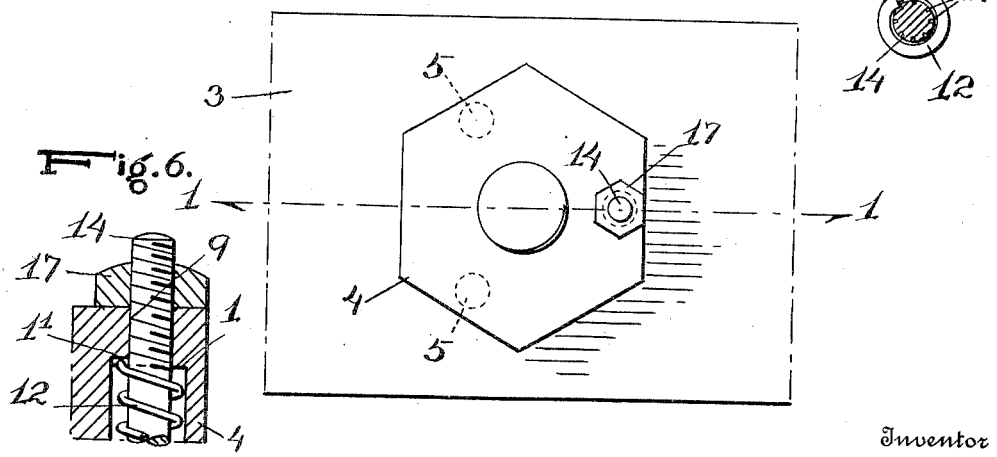
Inventor
Jacob Farrell
By E. W. Anderson & Son
his Attorneys
Witnesses
Stuart Hilder
Frances W. Anderson

UNITED STATES PATENT OFFICE.

JACOB FARRELL, OF BARRONVALE, PENNSYLVANIA.

NUT-LOCK.

1,098,790.  Specification of Letters Patent.  Patented June 2, 1914.

Application filed August 13, 1913. Serial No. 784,539.

*To all whom it may concern:*

Be it known that I, JACOB FARRELL, a citizen of the United States, resident of Barronvale, in the county of Somerset and State of Pennsylvania, have made a certain new and useful Invention in Nut-Locks; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a section on the line 1—1, Fig. 2. Fig. 2 is a face view of a nut having the invention applied thereto. Fig. 3 is a detail side view of the lock pin. Fig. 4 is a section on the line 4—4, Fig. 3, showing the spring in engagement with one of the notches in the pin. Fig. 5 is a detail sectional view of the nut, showing the notch in the shoulder. Fig. 6 is a detail sectional view of the nut, taken at right angles to Fig. 5, showing the engagement of the spring end with the notch.

The object of the invention is to provide an improved set nut or lock nut, and it consists in the novel construction and combinations of parts, as hereinafter set forth.

In the accompanying drawings, illustrating the invention, the numeral 2 indicates a bolt, passing through a beam or other structure 3 and secured by means of the improved lock nut 4. In the structure or work 3, near the bolt hole, is made a small catch recess 5. Usually three of these recesses, equally distant radially from the center of the bolt hole, are made, to provide for variation on account of wear. The lock nut 4 has the usual prismatic contour, and is provided with a perforation 6, parallel to the axis of the threaded bolt hole 7, this perforation being of larger diameter in its lower or inner portion 8 and of smaller diameter in its upper or outer portion 9. A shoulder, indicated at 1, is provided at the junction of these portions of the perforation, such shoulder forming a bearing for the upper end of a spring 12, which surrounds the shank 13 of a threaded lock pin 14, having an enlarged end 15 designed to fit easily the lower portion of the perforation 6 and terminating in a shoulder 16, against which the lower end of the spring 12 bears. The pin 14 is long enough to project from both upper and lower surfaces of the nut, and the upper end of the shank of this pin is threaded to engage a small adjusting nut 17, which operates in contact with the outer face of the nut 4.

The shoulder bearing 1 is usually provided with a jag or notch 1', to hold the spring from turning in one direction in the perforation or pin seat, and revolution in the opposite direction of said spring is designed to be prevented by means of small longitudinal grooves or elongated notches 19, made around that portion of the shank which is next the head of the pin, the lower spring end being turned inward to engage one of the longitudinal notches of the shank, and the upper spring end engaging the notch of the shoulder 1. This construction serves to prevent the pin from rotating with the adjusting nut 17 when the latter is turned.

In the operation of this lock nut, the small adjusting nut is turned upon the threaded end of the lock pin, to draw its enlarged end back into the perforation 4 until the outer face of this end is flush with the inner face of the nut. The lock nut can then be turned on the end of the bolt until its inner face touches the face of the structure or piece through which the bolt hole is made. The adjusting nut being then loosened, the pin comes under the control of the spring, and the lock nut being turned farther, the end of the lock pin will enter the catch recess. In this way the lock nut is designed to be held securely against turning. When the adjusting nut is turned to draw the lock pin out of engagement with the catch recess, the lock nut can be easily turned backward to release the bolt.

I claim:

In a nut lock, a base having an annular series of notches, a bolt nut having a flat outer face, a central threaded bolt aperture, and a perforation parallel to said aperture and having a lower larger portion and an upper smaller portion forming a shoulder at their junction, said shoulder being provided with a notch, a locking pin in said perforation having a threaded end projecting through the smaller portion thereof and having a shank provided with a series of longitudinal notches, and a head projecting from the larger portion of said perforation and engaging one of the notches of said base, a small nut engaging the projecting threaded end of said pin and the flat outer face of the bolt nut, and a coiled spring seated in the lower larger portion of said perforation and engaging at one end the notch of said shoulder and at the other end one of the notches of said shank, whereby the operation of the locking pin is designed to be controlled.

In testimony whereof I affix my signature, in presence of two witnesses.

JACOB FARRELL.

Witnesses:
 JAMES GARY,
 J. W. HENRY.

Copies of this patent may be obtained for five cents each, by addressing the "Commissioner of Patents, Washington, D. C."